Patented Oct. 30, 1945

2,388,084

UNITED STATES PATENT OFFICE 2,388,084

PYROLYSIS OF PINANE

Alfred L. Rummelsburg, Wilmington, Del., assignor to Hercules Powder Company, Wilmington, Del., a corporation of Delaware No Drawing. Application May 15, 1943,
Serial No. 487,152

9 Claims. (Cl. 260—680)

This invention relates to a method of isomerizing pinane and more particularly to a method of producing dihydroacyclic terpenes by means of the vapor-phase pyrolysis of pinane.

Many thermal reactions of unsaturated terpene hydrocarbons are known using various conditions of heating, contact time, type of reaction zone, pressure, and catalyst. However, no prior art is known where saturated terpenes have been treated, especially the saturated bicyclic terpene, pinane, under conditions to produce a mixture of dihydroacyclic terpenes. Dihydroacyclic terpenes have been prepared by means of the reduction of unsaturated acyclic terpenes in alcohol with sodium or other suitable hydrogenation medium. This reduction method at the present time is impractical because of the comparatively low yield of desirable dihydroacyclic terpenes and further, because the method is time-consuming and expensive.

Now, in accordance with the present invention, it has been discovered that a useful mixture of isomers of pinane, particularly dihydroacyclic terpenes may be produced in substantial yields directly from pinane by treating the pinane at a temperature above about 400° C., until conversion is at least partially complete.

The method in accordance with this invention is illustrated by the following specific examples, all parts and percentages being by weight unless otherwise specified.

Any pinane containing material having a preponderance of pinane may be used and is found suitable in accordance with this invention. Pinane, the starting material used in each of the following examples may be prepared by the catalytic hydrogenation of alpha- or beta-pinene according to methods well known in the art, particularly the pinane used in Example 1.

Two thousand parts of alpha-pinene were hydrogenated in the presence of "Raney" nickel catalyst under a pressure of 1100 to 2000 pounds per square inch at a temperature of 75° C. to 100° C. until about 19 parts of hydrogen was absorbed. The resulting hydrogenated product had a bromine number (centigrams bromine absorbed per gram of sample) of 1.5 and a refractive index of 1.4622 at 20° C.

Example 1

Five hundred parts of pinane having a bromine number of 1.5 and a refractive index $n^{20}$ of 1.4622 were placed in an evaporator flask and heated almost to its boiling point and then carried to a reaction zone by bubbling a stream of nitrogen into the evaporator. The reaction zone was maintained at a temperature between 500 and 560° C. The pinane was passed through the reaction zone at a rate of 1.9 parts liquid condensate per minute for 20 minutes. The pyrolyzate had a bromine number of 155 as compared to a bromine number of 230 for substantially pure dihydroacyclic terpenes and a refractive index $n^{20}$ of 1.4499, indicating the presence of a mixture of dihydroacyclic terpenes in an amount of about 67%.

Example 2

Five hundred parts of pinane having a bromine number of 3 and a refractive index $n^{20}$ of 1.4629 were placed in the evaporator and heated to almost its boiling point and the vapors carried through the reaction zone at the rate of 2.8 parts liquid condensate per minute for 30 minutes. The reaction zone was heated to a temperature between 430 and 480° C. A supported mildly acidic catalyst was positioned within the reaction zone directly in the path of travel of the pinane. The catalyst comprised 35 parts of pumice (pieces approximately ⅛ inch cross section) which had been mixed with a solution of 40 parts of sodium dihydro-orthophosphate ($NaH_2PO_4 \cdot H_2O$) in 64 parts of water for two hours and then dried in an oven at 120° C. for two hours. The pyrolyzate had a bromine number of 178 and a refractive index $n^{20}$ of 1.4488, indicating the presence of a mixture of dihydroacyclic terpenes in an amount of about 77%.

Identification of the pyrolyzate

Sufficient pyrolyzate was obtained in accordance with the method set forth in Example 2 to make up a charge of 1087 parts which were fractionally distilled through a 100 plate column with steel packing. Cut No. 1 was taken boiling between 158° C. and 160° C. at a pressure between 762.6 mm. of mercury and 760.8 mm. of mercury. This cut amounted to 270 parts of the original charge. A second cut was taken boiling between 160° C. and 163° C. at a pressure between 761.0 mm. of mercury and 761.3 mm. of mercury. This second cut weighed 193 parts of the original charge. Analysis of these cuts No. 1 and No. 2 were as follows:

| Cuts | No. 1 | No. 2 |
|---|---|---|
| Percent (of total) | 25 | 18 |
| B. P. °C. | 158.0–160.0 | 160.0–163.0 |
| $n_D^{20}$ | 1.4402 | 1.4465 |
| $d_4^{20}$ | 0.7662 | 0.7953 |
| Br. No. | 211.8–209.7 | 221.8–225.1 |

Each of the above cuts was analyzed for unsaturation and it was found that the pyrolyzate was made up of compounds having two double bonds. Seventy parts of cut No. 1 were hydrogenated using 15 parts of reduced nickel on kieselguhr (16 per cent nickel) as catalyst at 85 to 165° C. and a hydrogen pressure of 1100 to 1800 pounds per square inch. 2.26 parts of hydrogen, or 3.23 per cent by weight, were absorbed. The hydrogenated pyrolyzate had a bromine number of nil and a density $d_4^{20}$ of 0.7408. 50 parts of cut No. 2 were hydrogenated in the manner described for cut No. 1. About 3.24% by weight of hydrogen was absorbed. The hydrogenated pyrolyzate had a density $d_4^{20}$ of 0.7738 and a bromine number of nil. The accuracy of measuring the hydrogen absorption under the above hydrogenation conditions is about 5-10% which accounts for the result in excess of theory, which theory is calculated to be 2.94% for two double bonds. Tests made with maleic anhydride indicated that the dihydroacyclic terpenes do not contain a conjugated system of double bonds.

A comparison of the physical constants determined for the pyrolyzates with physical constants reported in the literature for certain dihydroacyclic terpenes indicates that the pyrolyzates contain substantially entirely a mixture of dihydromyrcene (2,6-dimethyl-2,7-octadiene); dihydroallo-ocimene (2,6-dimethyl-2,6-octadiene); and, 2,6-dimethyl-octadiene-2,5.

The pyrolysis temperature may vary from about 400° C. to about 700° C. The preferred pyrolysis temperature is between about 450° C. to about 550° C.

The pinane vapor may be passed through the reaction zone without the aid of a carrier. However, passage of the pinane vapor may be facilitated by means of an inert carrier such as a gas as, for example, steam, carbon dioxide, nitrogen, and other suitable gaseous diluents. It is desirable to pass the pinane vapor through the reaction zone at such a rate that the vapors will be subjected to the heating conditions of the reaction zone for a relatively short period of time as, for example, about 2 to about 20 seconds. Shorter periods of time are to be used at the higher temperatures as, for example, 700° C. and longer periods of time are to be used at the lower temperatures as, for example, 400° C. in comparison with the general contact time range of 2 to about 20 seconds.

The pyrolysis system will desirably consist of an evaporator, a preheater, a reaction zone, and a water-cooled condenser. The preheater and reaction zone may be heated in any suitable manner preferably, electrically. The entire system may be constructed of glass or of any durable metal as, for example, iron, steel, stainless steel, copper, etc.

The reaction zone may comprise a chamber either packed with such inert materials as porous chips, pumice, glass, iron turnings, etc., or constructed with metal baffles, or the chamber may be used in an unfilled or empty condition. It has been found that under certain conditions of operation it is easier to control the temperature of an empty reaction chamber than one filled as described above.

Catalysts may be used in the reaction chamber and under certain conditions of operation will promote the isomerization of the pinane to a mixture of dihydroacyclic terpenes by permitting pyrolysis of the pinane at a somewhat lower temperature than is necessary when no catalyst is employed. Mildly acidic catalysts such as sodium dihydro-orthophosphate, sodium monohydro-orthophosphate, boric acids, etc., may be employed desirably on the surface of an absorbent such as pumice, etc. Other mildly acidic catalysts are found to be operable in accordance with the present invention. In addition, siliceous materials such as silica gel, magnesium silicate, calcium silicates, etc., may be employed.

The dihydroacyclic terpenes obtained in accordance with the present invention boil in the range between about 158° C. and about 163° C. taken at 760 mm. pressure of mercury. The refractive index $n^{20}$ of a mixture of the dihydroacyclic terpenes varies between about 1.440 and about 1.454. The density $d_4^{20}$ of the mixture of dihydroacyclic terpenes varies between about 0.765 and about 0.805. The bromine number of the dihydroacyclic terpene mixture varies between about 190 and about 230.

The mixture of dihydroacyclic terpenes produced in accordance with the present invention is useful in producing high yields of lower molecular weight dienes and in other chemical reactions.

It is apparent, in view of the foregoing disclosure, that a new process has been discovered for producing a mixture of dihydroacyclic terpenes having a boiling point in the range between about 158° C. and about 163° C., and having a refractive index $n_D^{20}$ between about 1.438 and about 1.453 and having a density $d_4^{20}$ between about 0.765 and about 0.805 which comprises heating pinane to a temperature between about 400° C. and about 700° C. until isomerization of the pinane is at least partially complete.

What I claim and desire to protect by Letters Patent is:

1. A method of isomerizing pinane to a mixture of dihydroacyclic terpenes which comprises heating vapors consisting of vaporized pinane-containing material at a temperature above about 400° C. until isomerization is at least partially complete.

2. A method of isomerizing pinane to a mixture of dihydroacyclic terpenes which comprises heating vapors consisting of vaporized pinane-containing material at a temperature between about 400° C. and about 700° C. until isomerization is at least partially complete.

3. A method of isomerizing pinane to a mixture of dihydroacyclic terpenes which comprises heating vapors consisting of vaporized pinane-containing material at a temperature between about 450° C. and about 550° C. until isomerization is at least partially complete.

4. A method of isomerizing pinane to a mixture of dihydroacyclic terpenes which comprises heating vapors consisting of vaporized pinane-containing material at a temperature between about 430° C. and about 480° C. until isomerization is at least partially complete.

5. A method of isomerizing pinane to a mixture of dihydroacyclic terpenes which comprises carrying vapors consisting of vaporized pinane-containing material by means of an inert gas through a reaction zone heated at a temperature between about 400° C. and about 700° C., until isomerization is at least partially complete.

6. A method of isomerizing pinane to a mixture of dihydroacyclic terpenes which comprises heating vapors consisting of vaporized pinane-containing material at a temperature between about 450° C. and about 550° C. in the presence of a mildly acidic catalytic agent, until isomerization is at least partially complete.

7. A method of isomerizing pinane to a mixture of dihydroacyclic terpenes which comprises heating vapors consisting of vaporized pinane-containing material at a temperature between about 450° C. and about 550° C., in the presence of sodium dihydro-orthophosphate, until isomerization is at least partially complete.

8. A method of isomerizing pinane to a mixture of dihydroacyclic terpenes which comprises heating vapors consisting of vaporized pinane-containing material in an empty reaction zone at a temperature from about 400° C. to about 700° C. until isomerization is at least partially complete.

9. A method of isomerizing pinane to a mixture of dihydroacyclic terpenes, which comprises heating vapors consisting of vaporized pinane-containing material at a temperature between about 450° C. and about 550° C. in the presence of boric acid, until isomerization is at least partially complete.

ALFRED L. RUMMELSBURG.